United States Patent [19]

Bustamante

[11] 4,165,752

[45] Aug. 28, 1979

[54] TOBACCO SUBSTITUTE MADE FROM COFFEE CHERRIES AND A PROCESS FOR MAKING SUCH

[76] Inventor: Carlos R. Bustamante, 5303 Alta Vista Rd., Bethesda, Md. 20014

[21] Appl. No.: 712,356

[22] Filed: Aug. 6, 1976

Related U.S. Application Data

[63] Continuation-in-part of Ser. No. 683,677, May 5, 1976, which is a continuation-in-part of Ser. No. 620,277, Oct. 7, 1975, abandoned.

[51] Int. Cl.² ............................................. A24D 1/18
[52] U.S. Cl. .................................................. 131/2
[58] Field of Search .................... 131/2, 17 R, 17 AC, 131/17 C, 140 C, 144; 426/454, 594, 595, 489, 472, 467, 468

[56] References Cited

U.S. PATENT DOCUMENTS

| | | | |
|---|---|---|---|
| 312,516 | 2/1885 | Schilling | 426/594 X |
| 326,227 | 9/1885 | Long | 426/595 X |
| 1,927,984 | 9/1933 | Krensky et al. | 131/2 X |
| 2,097,591 | 11/1937 | Finley | 426/467 |
| 2,190,176 | 2/1940 | Smith | 426/489 X |
| 2,707,472 | 5/1955 | Jurgensen, Jr. et al. | 131/140 C |
| 3,083,104 | 3/1963 | Celmer | 426/489 X |
| 3,645,756 | 2/1972 | Huth | 426/489 X |
| 3,775,133 | 11/1973 | Batley, Jr. | 426/489 X |
| 3,820,548 | 6/1974 | Buchmann et al. | 131/2 |

FOREIGN PATENT DOCUMENTS 15544 of 1906 United Kingdom ...................... 426/454

OTHER PUBLICATIONS

The American Heritage Dictionary of the English Language, 1976, Copyright by Houghton Mifflin Company, Boston, Mass., 02107, Library of Congress Catalog, Card No. 76-86995, pp. 258 and 259.
Coffee Processing Technology by Sivetz et al., Pub. by AVI Pub. Co., 1963, Westport, Conn., vol. 1, pp. 48-65.
All About Coffee by Ukers, 2nd Edit., 1935, Pub. by The Tea and Coffee Trade Journal Co., pp. 9-12 and 143-144.

*Primary Examiner*—Robert W. Michell
*Assistant Examiner*—V. Millin
*Attorney, Agent, or Firm*—Birch, Stewart, Kolasch & Birch

[57] ABSTRACT

A tobacco substitute made from whole coffee cherries.

4 Claims, 2 Drawing Figures

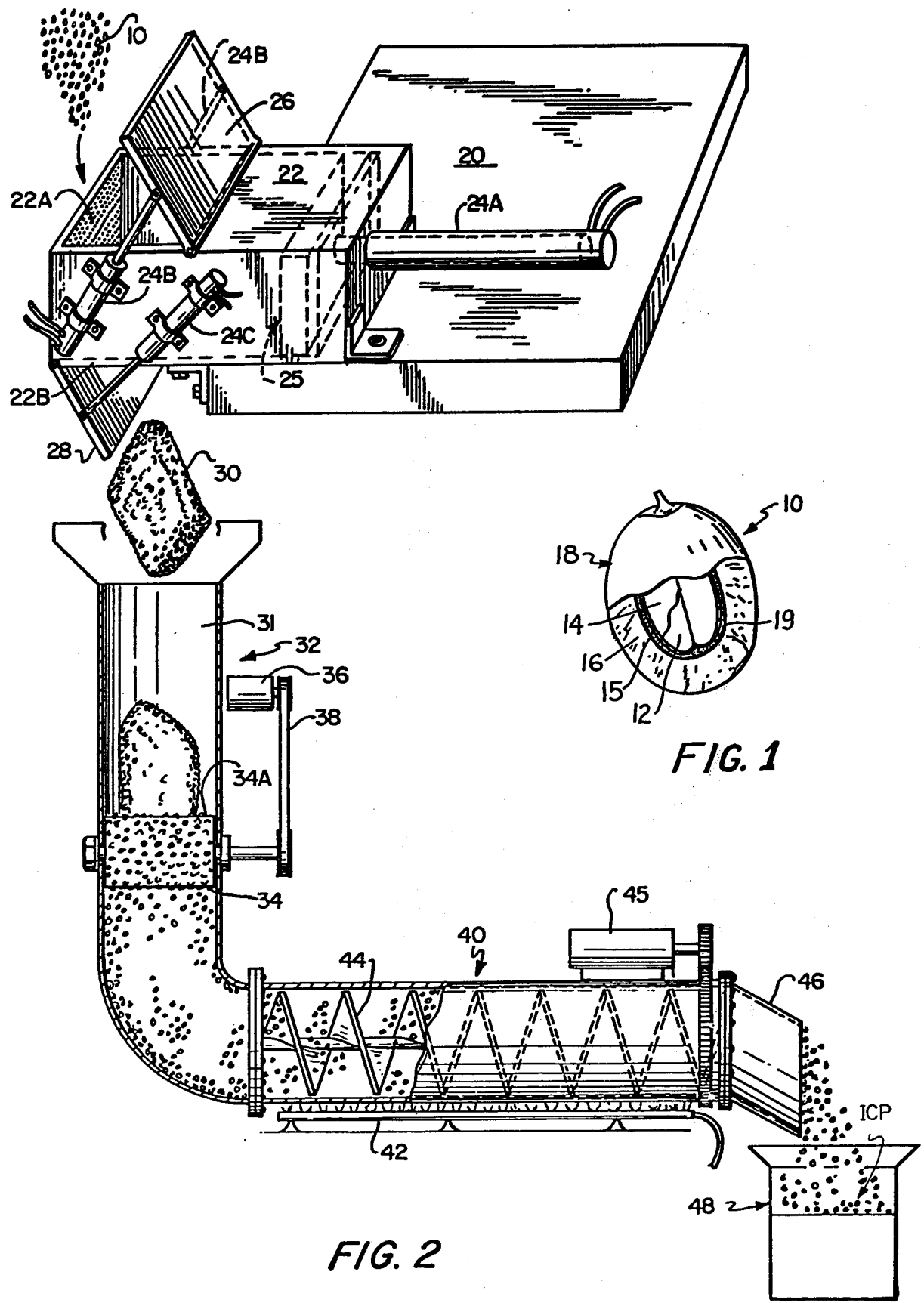

TOBACCO SUBSTITUTE MADE FROM COFFEE CHERRIES AND A PROCESS FOR MAKING SUCH

This application is a continuation-in-part of copending application Ser. No. 683,677 filed May 5, 1976 which is a continuation-in-part of application Ser. No. 620,277 filed Oct. 7, 1975 now abandoned and entitled "Process And Apparatus For Making A Coffee Product From The Whole Coffee Cherry". It is intended to incorporate herein by reference the disclosures of said copending applications.

FIELD OF THE INVENTION

The present invention relates to a process and apparatus for manufacturing a smokable coffee product from the whole coffee cherry.

BACKGROUND OF THE INVENTION

Smoking, to many people, is a highly desirable personal habit or practice despite the mounting body of evidence that the smoking of tobacco in cigarette form in particular has many undesirable and potentially hazardous effects on the smoker.

Programs have been instituted in an attempt to produce less hazardous cigarettes by the treatment of tobacco and tobacco products to remove as many undesirable components and constituents therefrom as possible without destroying the flavor of the ultimate smokable product.

For example, there appear to be certain key characteristics which consumers consider a requisite for acceptability of cigarette products. For example, if the cigarette does not have a fragrance which is generally tobacco-like or at least similar to the fragrance of burning tobacco, then the product is considered unacceptable. Also the character of the smoke must be other than that of a burning paper and more like wood smoke or the like and produce both moistness and fullness in the mouth of the consumer smoking the final product.

In addition to the foregoing, other efforts have been made to develop tobacco substitutes including, for example, the use of chemically treated coffee bean hulls and the like such as described in U.S. Pat. No. 3,796,222 of Edward J. Deszyck entitled "Method of Making a Smoking Product From Coffee Bean Hulls" issued Mar. 12, 1974. This patent discloses a number of relatively complex chemical treatments of coffee bean hulls in order to cause specific chemical reactions and extractions of the components of the coffee hulls to produce a smokable coffee product which is usable either alone or as disclosed in the patent, preferably in a mixture with natural tobacco.

However, in the patent just identified, as well as in other smoking products, expensive chemical reagents such as humectants are all considered to be a required component of the ultimate product and accordingly, greatly increase the cost of the product.

OBJECTS OF THE INVENTION

Accordingly, it is an object of the present invention to provide a new and novel apparatus and process for making a smokable coffee product from the whole coffee cherry.

It is further object of the present invention to provide an apparatus and process for economically and efficiently making a smokable coffee product from the whole coffee cherry in which the smokable coffee products may be stored in an intermediate product form or in a final finished smokable product form.

These and other objects of the present invention will become more fully apparent with reference to the following specifications and drawings which relate to a preferred embodiment of the present invention.

SUMMARY OF THE INVENTION

As disclosed in the copending applications above-identified, applicant has discovered that fermentation of the pulp surrounding the coffee bean between the parchment and the cod can be precluded by partially dehydrating the entire coffee cherry, promptly grinding the entire cherry into particles, and promptly roasting or processing the particles in a conventional manner to form a coffee product.

At this stage of the process, the formed coffee product is in primarily a brewable form from which to produce a beverage.

In order to render the beverage style intermediate product more smokable, it has been discovered by our applicant that a further step is essential in order to give the intermediate product characteristics which produce a more desirable smokable product to enhance flavor, burning qualities, and aroma.

Simply stated, the additional treatment of the intermediate coffee product formed from the whole coffee cherry as above described, is provided by hydrating the intermediate product and subsequently evaporating the moisture from the product at which time the dried end product is in the form of granules or shredable sheets which may be placed into cigarettes, pipes, or other smoking paraphernalia and smoked as a pure smoking product or, if desired, mixed with tobacco in any desired proportions.

There is no need, however, to admix the smokable coffee product of the present invention with tobacco since it is a smokable product with all of the desirable characteristics of fullness of flavor, a sense of moist flavor in the mouth, and desirable aroma and character in the smoke produced therefrom.

The dehydration of the whole coffee cherry in a preferred embodiment is performed by a mechanical type press of any suitable design. The coffee cherries are subjected to a compressional force in the press which dehydrates the coffee cherries to a selected degree and forms the cherries into blocks or pellets.

The blocks or pellets are then immediately introduced into a grinder to disintegrate them into particles.

The particles are then immediately roasted or processed in a conventional manner. The process of the present invention to this point is an integrated process in which steps are carried out in succession without any significant periods between steps. In this way, the coffee cherries are precluded from fermenting because of the combined effect of the successive steps of the integrated process over the time frame in which they are performed.

Therefore, at this point in time, an intermediate roasted product has been produced which if desired, can be brewed into a beverage and which has an enhanced shelf life in that form.

Because of the present process, the intermediate product can be produced rapidly and economically in the country of origin of the coffee cherries and then shipped in the intermediate product form for end use throughout the world either as a beverage or as a smokable coffee product.

When it is desired to further process the intermediate coffee product into a smokable coffee product, then the intermediate product is hydrated, such as by mixing the product with water in a suitable blender, for example, proportions of fifty percent water and fifty percent coffee product by volume, and then permitting the hydrated slurry to dry by evaporating the water therefrom on a drying surface. The resulting product is preferably broken up into granules of a desired size and consistency from the dried state at which point in time the product is fully smokable either in its pure form or as a mixer with conventional tobacco and the like.

As previously disclosed in the above-referenced copending applications, the pulp of the whole coffee cherry is known to contain carbohydrates, salts and proteins dissolved in the aqueous phase. All of these may have effect on the final characteristics of the intermediate product. Thus, in the intermediate product prior to the hydration and evaporation steps of the present invention there are present water-soluble carbohydrates which have been carmelized during roasting to provide a coating around each roasted particle since the roasting has taken place with those natural juices of the whole coffee cherry remaining after the pressing and comminution. Consequently, the natural flavors and aromas are trapped within each particle by these coatings. Accordingly, by hydrating the roasted particles constituting the intermediate product, these coatings are apparently dissolved and upon evaporation certain volatile constituents of the intermediate product are apparently removed, thereby providing the smokable coffee product with unique qualities of smell, taste and texture which render it desirable as a smokable coffee product.

Since the intermediate coffee product of the present invention has an increased shelf life and may in fact be stored unpressurized for long periods without any significant detrimental effect on the flavor, it is noted that the present invention permits the coffee product to remain in this form over a period of one or more years such that depending upon the conditions of the world market, persons may select whether to make use of the intermediate product as a beverage or to process it further into a smokable product. This gives coffee producing nations more economic flexibility with regard to the end use of their product than ever before thought to be possible.

BRIEF DESCRIPTION OF THE DRAWINGS

The objects of the present invention and attendant advantages can best be understood by reference to the accompanying drawings wherein:

FIG. 1 is a cross section of a whole coffee cherry; and

FIG. 2 is a diagramatic view of a preferred embodiment of the processing machinery of the present invention.

DETAILED DESCRIPTION OF PREFERRED EMBODIMENT

Referring in detail to FIG. 1 there is illustrated a whole coffee cherry generally designated 10. The cherry consists of inner beans 12, covered by an inner shell or chaff 14, parchment 15 surrounding the chaff, a layer of mucilage 19 surrounding the parchment, pulp 16 contiguous to the mucilage and an outer shell or cod 18.

As stated hereinbefore in making conventional hot coffee beverages which are known today the mucilage 19, pulp 16 and the outer shell or cod 18 are removed because of the tendency of each of the above constituents to spoil or ferment.

The process and apparatus of the present invention make it possible to utilize the entire coffee cherry including the mucilage 19, the parchment 15, the pulp 16 and cod 18 to produce a coffee product with controlled flavor and increased yield per cherry.

The process of the present invention can best be understood by reference to FIG. 2. As illustrated therein a plurality or predetermined quantity of whole coffee cherries 10 are introduced at a first station into a mechanical press and pelletizer generally indicated at 20.

The press consists of a chamber 22 with inlet and outlet openings 22A, 22B, respectively. A hinged door 26 is provided over inlet opening 22A and a similar door 28 is provided over outlet opening 22B. Each of the doors may be actuated between open and closed positions by suitable hydraulic pistons 24B and 24C, respectively.

A compression piston head 25 is provided in one end of chamber 22 and is suitably coupled through the end wall of chamber 22 to hydraulic drive piston 24A.

The hydraulic pistons 24A, 24B, 24C are operated in synchronism to compress the coffee cherries and thus dehydrate and pelletize the same in the following manner. With piston head 25 in the position shown, piston 24B is actuated to open door 26 and thus permit the introduction of a predetermined quantity of cherries 10 through opening 22A into chamber 22. At this time door 28 is closed. Door 26 is then closed by deactivating piston 24B and piston 24A is actuated to drive piston head 25 to the left. Piston head 25 pushes against the cherries 10 and compresses the same thus, forming a pellet or block 30 of broken whole coffee cherries. The piston head 25 is then retracted permitting the block 30 to drop to the next processing station through door 28, which is opened in synchronism with retraction of piston 25.

For reasons stated hereinbefore by varying the compressional force generated by piston 25 the flavor of the resulting coffee product can be controlled. For example, if a pressure of X psi is applied to hydraulic cylinder 24A, a strong flavored coffee may result. However, if a pressure of Y psi is applied, a more mellow flavor might result. This change in flavor, as stated hereinbefore, is believed to be caused by the controlled removal of selected quantities of the oils and chemical substances in the aqueous phase within the whole coffee cherry.

Block or pellet 30 consists of dehydrated whole coffee cherries.

Suitable means may be provided in chamber 22 for receiving the liquid squeezed out of the coffee cherries in chamber 22.

The second processing station consists of a funnel shaped cylindrical conveyor chute 31 and a grinder 32. The pellets 30 enter the open end of the conveyor 31 and drop into contact with grinder rotor 34 which disintegrates the dehydrated coffee cherries into small particles.

Grinder rotor 34 has protuberances 34A thereon for disintegrating the cherries and is driven via a belt and sprocket drive 38 by a motor 36.

The ground particles consisting of all the constituents of the whole coffee cherry are then fed to a third station where they are roasted by a roaster 40.

Roaster 40 may be of any conventional type and by way of example may include a screw conveyor 44 driven by a motor 45 and a gas heater 42 to provide for the progressive and continuous roasting of the ground coffee particles.

A conduit 46 is provided for feeding the roasted coffee to a packaging station 48. A final grinding station may be placed, if desired, between the conduit 46 and packaging station 48.

The intermediate coffee product ICP at the packaging station 48 may be maintained in its beverage producing form for relatively indefinite periods of time until such time as a decision is made by the producer to either market it as a beverage base or to further treat it and produce a smokable coffee product therefrom.

In order to produce the smokable coffee product from the intermediate coffee product ICP, the present invention requires only that the intermediate coffee product ICP by hydrated for example, fifty percent of the product ICP and fifty percent of water by volume is hydrated in a blender and after five minutes of agitation is permitted to evaporate by spreading it on an evaporating surface or the like. The resulting dried product is then broken up into particles of desirable size and placed either in a cigarette configuration or into the bowl of a conventional pipe. At this point, the resulting end product need only be ignited by an ordinary match or the like and smoked as if it were tobacco.

If desired, various proportions of the smokable coffee product of the present invention may be mixed with natural tobacco to provide taste variations to suit a given smoker.

Accordingly, as can be seen from the foregoing specifications and drawings the present invention has provided a new and novel process by which whole coffee cherries may be treated selectively and in controllable time frames to produce either a beverage base or a smokable coffee product and in which the beverage base has a sufficiently indefinite shelf life to provide to the producer a valuable economic choice with regard to whether or not the end product shall be a beverage base or a smokable product to thereby provide him with a powerful economic tool in the world market.

What is claimed is:

1. A process for making a coffee product from whole coffee cherries comprising the steps of:
   a. applying a compressional force to said whole coffee cherries of sufficient magnitude to dehydrate said cherries to a selected degree;
   b. comminuting said dehydrated cherries into particles;
   c. roasting said particles to provide an intermediate brewable coffee product of enhanced shelf life; and
   d. hydrating said intermediate brewable coffee product and subsequently evaporating same to provide a smokable coffee product.

2. The smokable coffee product by the process of claim 1.

3. A process for making a coffee product from whole coffee cherries comprising the steps of:
   a. breaking said whole coffee cherries up into particles;
   b. dehydrating said particles to a selected degree;
   c. comminuting said dehydrated particles into finer particles;
   d. roasting said particles to produce an intermediate brewable coffee product of enhanced shelf life;
   e. hydrating said intermediate product; and
   f. evaporating the water of hydration and other volatile constituents from said coffee product to produce a smokable coffee product.

4. The smokable coffee product by the process of claim 3.

* * * * *